(12) United States Patent
Kim

(10) Patent No.: US 11,417,112 B2
(45) Date of Patent: Aug. 16, 2022

(54) OBJECT SENSING APPARATUS

(71) Applicants: HYUNDAI MOTOR COMPANY, Seoul (KR); KIA MOTORS CORPORATION, Seoul (KR)

(72) Inventor: Min Han Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 465 days.

(21) Appl. No.: 16/511,939

(22) Filed: Jul. 15, 2019

(65) Prior Publication Data

US 2020/0167577 A1  May 28, 2020

(30) Foreign Application Priority Data

Nov. 27, 2018 (KR) .................. 10-2018-0148688

(51) Int. Cl.
| | |
|---|---|
| *G06V 20/58* | (2022.01) |
| *B60Q 1/00* | (2006.01) |
| *G01S 13/931* | (2020.01) |
| *G01S 7/40* | (2006.01) |
| *G01S 13/00* | (2006.01) |

(52) U.S. Cl.
CPC .......... *G06V 20/58* (2022.01); *B60Q 1/0023* (2013.01); *G01S 13/931* (2013.01); *G01S 7/403* (2021.05); *G01S 7/4034* (2021.05)

(58) Field of Classification Search
CPC .......... G06K 9/00805; G06K 9/00791; G06K 9/2027; B60Q 1/0023; B60Q 1/12; B60Q 1/076; B60Q 1/1423; B60Q 1/115; B60Q 1/143; G01S 13/931; G01S 7/403; G01S 7/4034; G01S 7/027; G01S 2013/93277; G01S 15/931; G01S 2015/932; G01S 7/48; B60R 21/0134; F16H 1/04; B60W 2420/506; B60W 2554/00; H01Q 1/125; H01Q 3/10; F41G 7/2206; G06V 20/58; G06V 10/141

See application file for complete search history.

(56) References Cited

U.S. PATENT DOCUMENTS

| | | | | |
|---|---|---|---|---|
| 3,707,721 A | * | 12/1972 | McCartney | .............. H01Q 3/10 |
| | | | | 343/759 |
| 4,142,695 A | * | 3/1979 | Remmell | .............. F41G 7/2206 |
| | | | | 244/3.14 |
| 5,430,450 A | * | 7/1995 | Holmes | .................. B60Q 1/143 |
| | | | | 342/69 |
| 6,572,248 B2 | * | 6/2003 | Okuchi | ................ B60Q 1/1423 |
| | | | | 362/464 |
| 10,126,420 B2 | | 11/2018 | Lee et al. | |

(Continued)

FOREIGN PATENT DOCUMENTS

| | | | | |
|---|---|---|---|---|
| EP | 0147900 A2 | * | 7/1985 | ............. H01Q 1/125 |
| EP | 1130416 A2 | * | 9/2001 | ........... B60Q 1/0023 |

(Continued)

*Primary Examiner* — Bernarr E Gregory
(74) *Attorney, Agent, or Firm* — Lempia Summerfield Katz LLC

(57) ABSTRACT

An object sensing apparatus including: an object sensor mounted at a front upper portion of a vehicle; a vertical-tilting mechanism to allow the object sensor to tilt around a horizontal axis; and a horizontal-rotating mechanism to allow the object sensor to rotate around a vertical axis.

12 Claims, 23 Drawing Sheets

(56) References Cited

U.S. PATENT DOCUMENTS

| | | | | |
|---|---|---|---|---|
| 2001/0040810 A1* | 11/2001 | Kusagaya | ............... | B60Q 1/115 362/351 |
| 2008/0158045 A1* | 7/2008 | Teranishi | .............. | G01S 13/931 342/70 |
| 2013/0092852 A1* | 4/2013 | Baumatz | ................... | G01S 7/48 250/578.1 |
| 2016/0274231 A1 | 9/2016 | Lee et al. | | |

FOREIGN PATENT DOCUMENTS

| | | | | |
|---|---|---|---|---|
| EP | 3315994 A1 * | 5/2018 | ........... | G01S 13/931 |
| KR | 10-2006-0066860 A | 6/2006 | | |
| KR | 10-2011-0120128 A | 11/2011 | | |
| KR | 10-2013-0136107 A | 12/2013 | | |
| KR | 10-2015-0108680 A | 9/2015 | | |
| KR | 10-2016-0066763 A | 6/2016 | | |
| WO | WO2010/004017 A2 * | 1/2010 | ............. | B60Q 1/076 |

\* cited by examiner

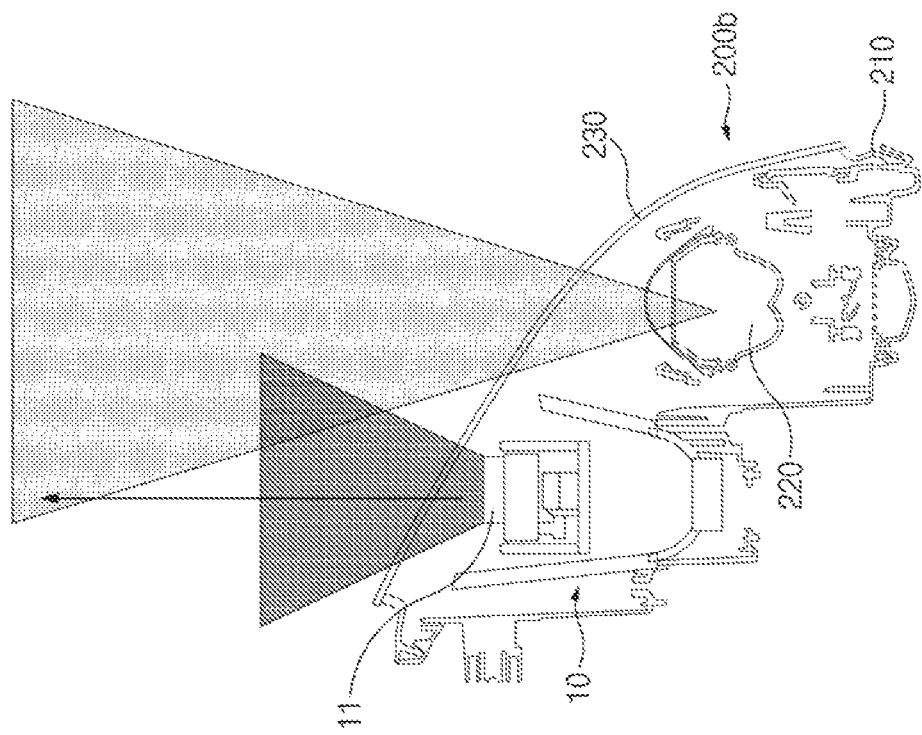
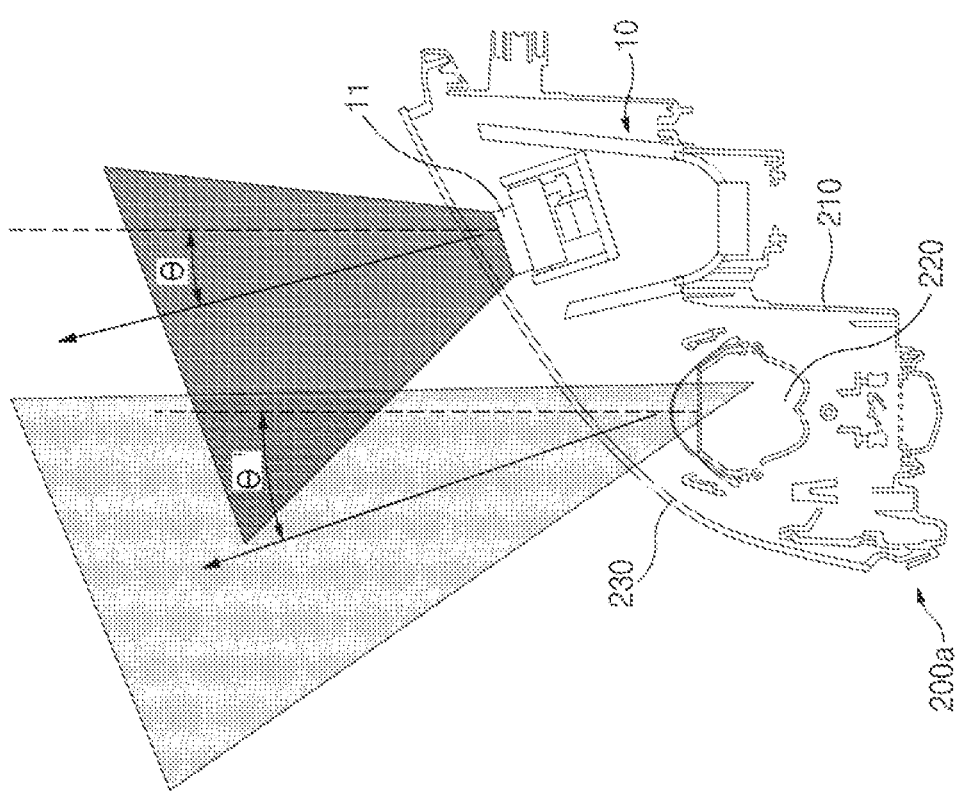
FIG. 16

OBJECT SENSING APPARATUS

CROSS-REFERENCE TO RELATED APPLICATION

This application claims priority to and the benefit of Korean Patent Application No. 10-2018-0148688, filed on Nov. 27, 2018, the entire contents of which are incorporated herein by reference.

FIELD

The present disclosure relates to an object sensing apparatus and a control method thereof, and more particularly, to an object sensing apparatus capable of accurately recognizing an object located outside a vehicle.

BACKGROUND

The statements in this section merely provide background information related to the present disclosure and may not constitute prior art.

Vehicles are equipped with a variety of sensors, cameras, electronic devices, and the like, in order to improve vehicle safety technology and driver's convenience. In recent years, research and development on technologies, such as advanced driver assistance system (ADAS) and autonomous vehicles, have actively been conducted.

Meanwhile, in order to effectively achieve improvements in the vehicle safety technology and the driver's convenience, it is necessary to accurately perceive the environment of the vehicle, such as its surrounding terrain, nearby vehicles, pedestrians, and road conditions when the vehicle is travelling or parked. To this end, an object sensing apparatus employing an object sensor such as radar or lidar may be mounted on the front of the vehicle, the roof of the vehicle, or the like.

However, a conventional object sensing apparatus may be highly affected by external conditions such as vehicle driving conditions, road conditions, and sunlight, and thus it may fail to accurately recognize objects (surrounding terrain, road conditions, nearby vehicles, pedestrians, and the like) located outside the vehicle. For example, as the recognition range of the object sensor such as radar is set to be relatively narrow, the conventional object sensing apparatus often fails to accurately recognize the other vehicles, the surrounding terrain, or the like.

When an attempt to modify a vehicle body design is made in order to increase the recognition range of the object sensor, its development period may be increased, and as the object sensor partially closes an opening of a front grille of the vehicle, this may lead to a reduction in engine cooling performance and an increase in the size of the front grille of the vehicle, and the repair cost may be increased in the event of low-speed collision.

In addition, another conventional object sensing apparatus may include a pair of object sensors disposed at the bottom of a bumper of the vehicle. When the pair of object sensors are disposed at the bottom of the bumper, they may be susceptible to contamination and watertightness, and since they are replaced or repaired only by removing the bumper, this may lead to difficulties in repair and maintenance.

The above information described in this background section is provided to assist in understanding the background of the inventive concept, and may include any technical concept which is not considered as the prior art that is already known to those skilled in the art.

SUMMARY

An aspect of the present disclosure provides an object sensing apparatus capable of accurately recognizing an object located outside a vehicle by moving an object sensor according to vehicle driving conditions, external environment, and the like.

According to an aspect of the present disclosure, an object sensing apparatus may include: an object sensor mounted at the front of a vehicle; a vertical-tilting mechanism configured to allow the object sensor to tilt around a horizontal axis; and a horizontal-rotating mechanism configured to allow the object sensor to rotate around a vertical axis.

The object sensor may be mounted in a lamp assembly of the vehicle.

The object sensor may be mounted in a sensor holder, and the sensor holder may be mounted to tilt around the horizontal axis with respect to a support body.

The support body may have a pair of support protrusions, the sensor holder may have a pair of first pivot shafts rotatably mounted on the pair of support protrusions, and axes of the pair of first pivot shafts may become the horizontal axis.

The vertical-tilting mechanism may include a first sector gear fixed to a back surface of the sensor holder, a first pinion meshing with the first sector gear, and a first actuator rotating the first pinion.

The first actuator may be mounted on the support body.

The horizontal-rotating mechanism may include a base disposed below the support body, a second sector gear mounted on the base, a second pinion meshing with the second sector gear, and a second actuator rotating the second pinion.

The support body may be rotatably connected to the base via a second pivot shaft, and an axis of the second pivot shaft may become the vertical axis.

The base may have an arc-shaped slot, and the second sector gear may be fixed to the slot of the base.

The object sensing apparatus may further include a heat protector surrounding both side surfaces and a rear surface of the support body.

The heat protector may include a first wall facing the rear surface of the support body, and a pair of second walls facing the side surfaces of the support body.

The heat protector may further include a cooling fan which is mounted on the first wall.

The heat protector may further include a blowing guide which is disposed around the cooling fan.

The support body may have a plurality of cooling holes in a portion thereof facing the cooling fan.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 16 illustrates a structure in which a pair of object sensors in a pair of object sensing apparatuses according to an exemplary form of the present disclosure are mounted in a pair of front headlamp assemblies, respectively;

Figure 1:
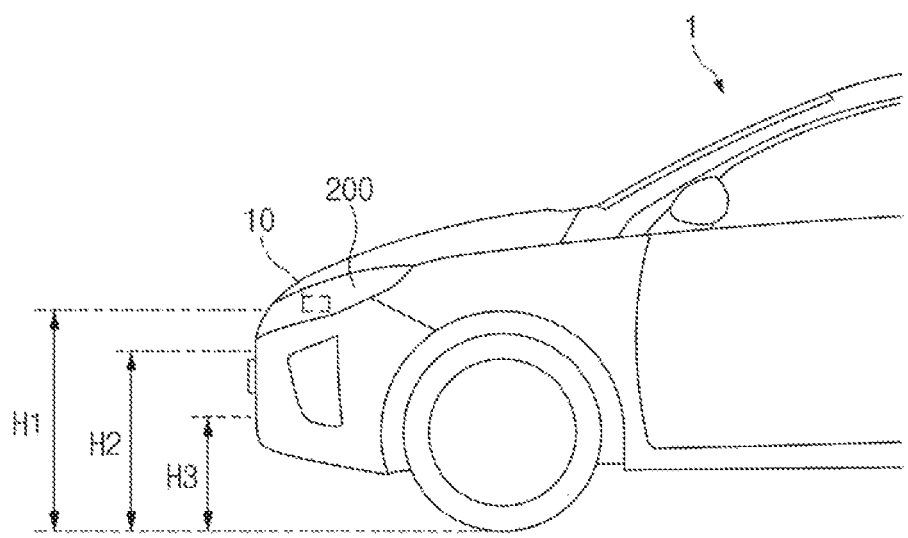
FIG. 1 illustrates a front structure of a vehicle equipped with an object sensing apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These tams are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, an object sensing apparatus 10 according to an exemplary form of the present disclosure may be mounted in a variety of lamp assemblies for a vehicle, such as headlamps, fog lamps, brake lamps, side lamps, and turn signal lamps, in order to prevent contamination caused by the intrusion of foreign substances, and to detect an object quickly and accurately.

In addition, the object sensing apparatus 10 may be disposed at a front upper portion of the vehicle to relatively increase the ground clearance of the object sensing apparatus 10. Thus, when the vehicle is travelling on terrain with elevation changes such as a hillside road, the object sensing apparatus 10 may quickly and accurately detect terrain changes and objects such as other vehicles and pedestrians located outside the vehicle.

For example, a front headlamp assembly 200 is disposed in a position higher than or equal to a predetermined height H1 in accordance with headlight height regulations. As illustrated in FIG. 1, the object sensing apparatus 10 may be mounted in each front headlamp assembly 200 so that the object sensing apparatus 10 may be positioned in the front of the vehicle at the height H1 at which the object sensing apparatus 10 is able to accurately recognize the object.

Meanwhile, as a conventional object sensing apparatus is disposed at the center or bottom of a front grille of a vehicle, a height H2 or H3 of this object sensing apparatus may be relatively low. Accordingly, when the vehicle is travelling on terrain with elevation changes such as a hillside road, terrain changes and objects such as other vehicles and pedestrians located outside the vehicle may be detected late, and thus when driving assistance and autonomous driving (self-driving) are performed, a response thereto may be very late and ride comfort and fuel efficiency may be reduced. On the other hand, the object sensing apparatus 10 according to an exemplary form of the present disclosure is mounted in the front headlamp assembly 200 so that it may be positioned at the height H1 relatively higher than that of the conventional object sensing apparatus. Accordingly, when the vehicle is travelling on terrain with elevation changes such as a hillside road, terrain changes and objects (e.g., other vehicles and pedestrians) located outside the vehicle may be detected quickly and accurately, and thus when driving assistance and autonomous driving are performed, a response thereto may be very fast and ride comfort and fuel efficiency may be improved.

Hereinafter, for convenience of explanation, it will be described that the object sensing apparatus 10 is mounted in the front headlamp assembly 200 in the drawings, but the inventive concept is not limited thereto. The object sensing apparatus 10 may be mounted in a variety of lamp assemblies for a vehicle, such as fog lamps, turn signal lamps, and brake lamps.

Figure 2:
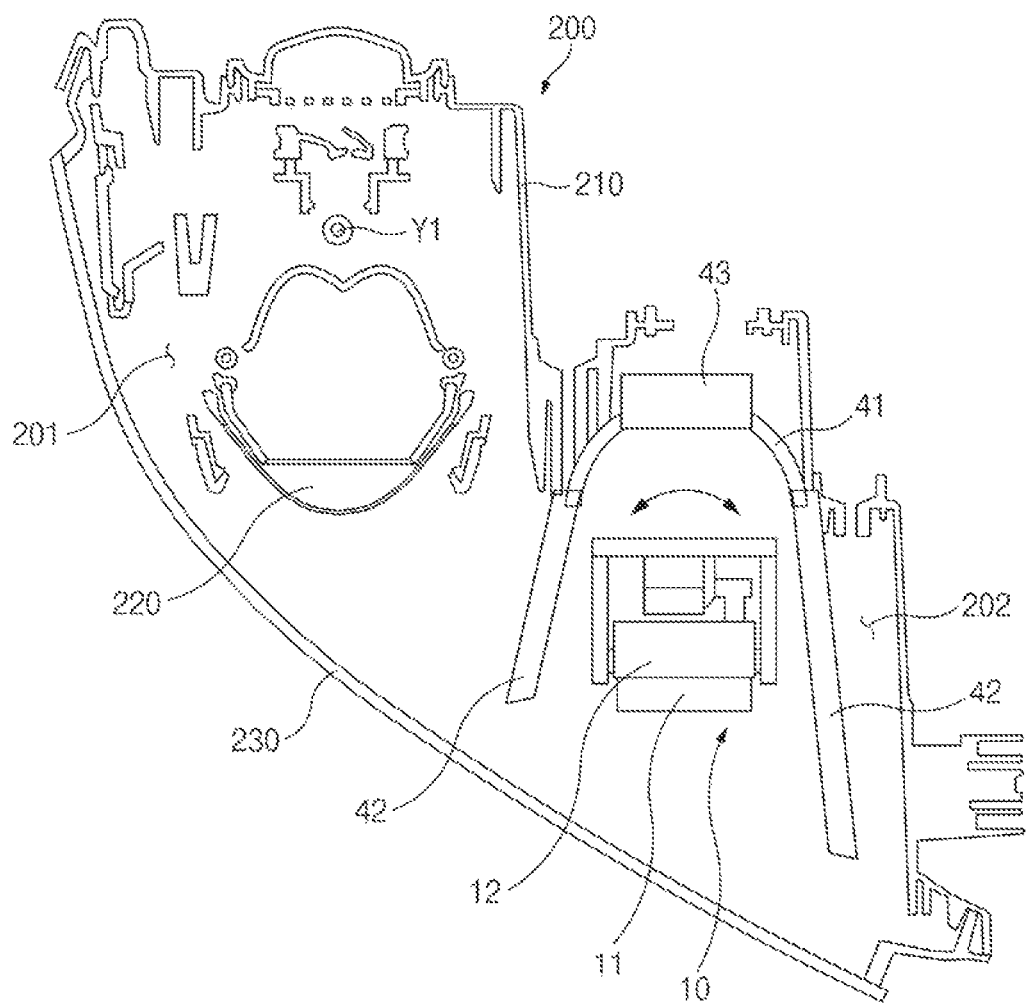
FIG. 2 illustrates a cross-sectional view of a structure in which an object sensing apparatus according to an exemplary form of the present disclosure is mounted in a front headlamp assembly of a vehicle.
Figure 3:
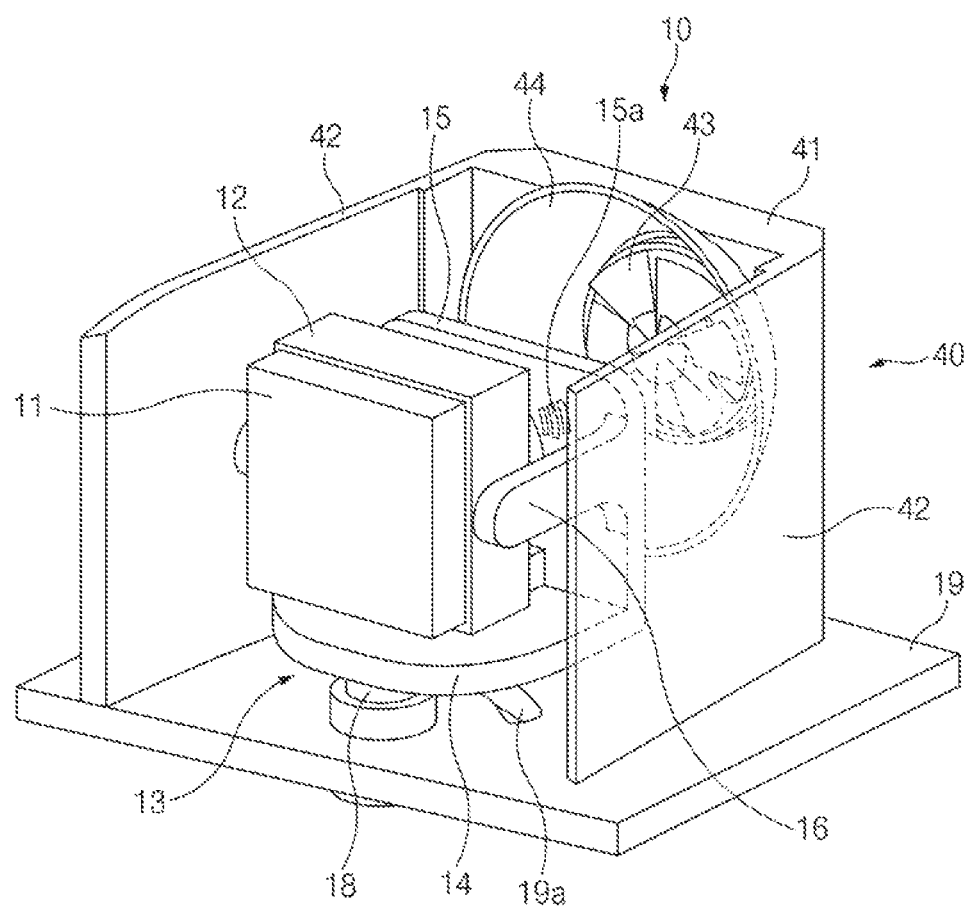
FIG. 3 illustrates a perspective view of an object sensing apparatus according to an exemplary form of the present disclosure.
Figure 4:
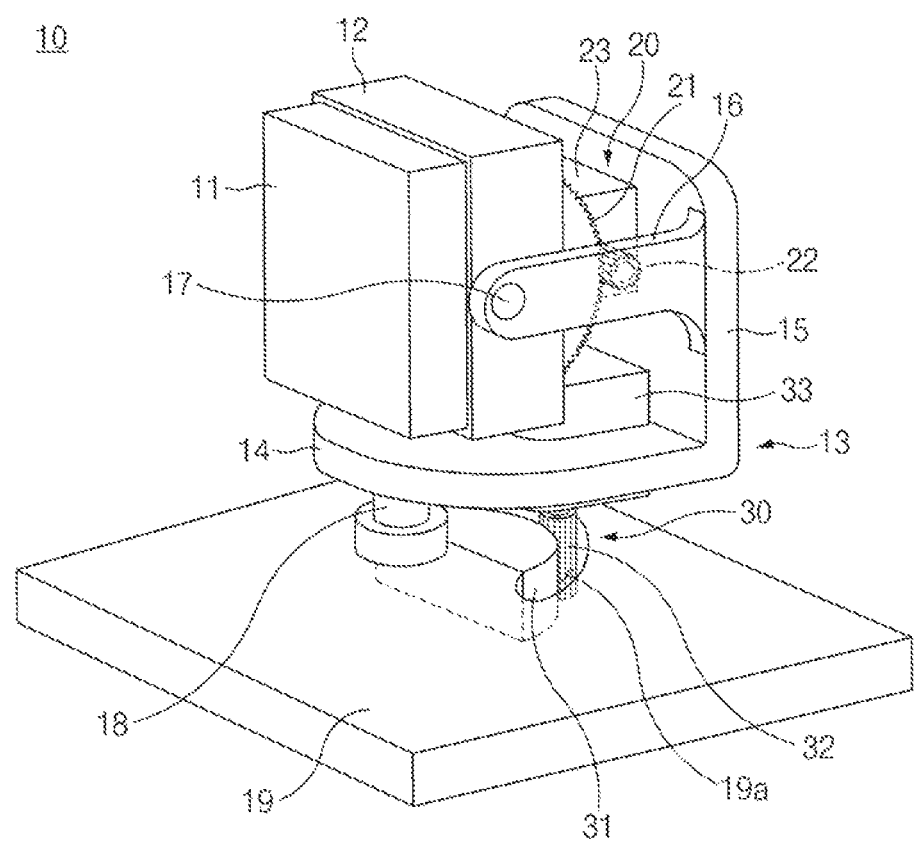
FIG. 4 illustrates a perspective view of an object sensing apparatus according to an exemplary form of the present disclosure, from which a heat protector is omitted.
Figure 5:
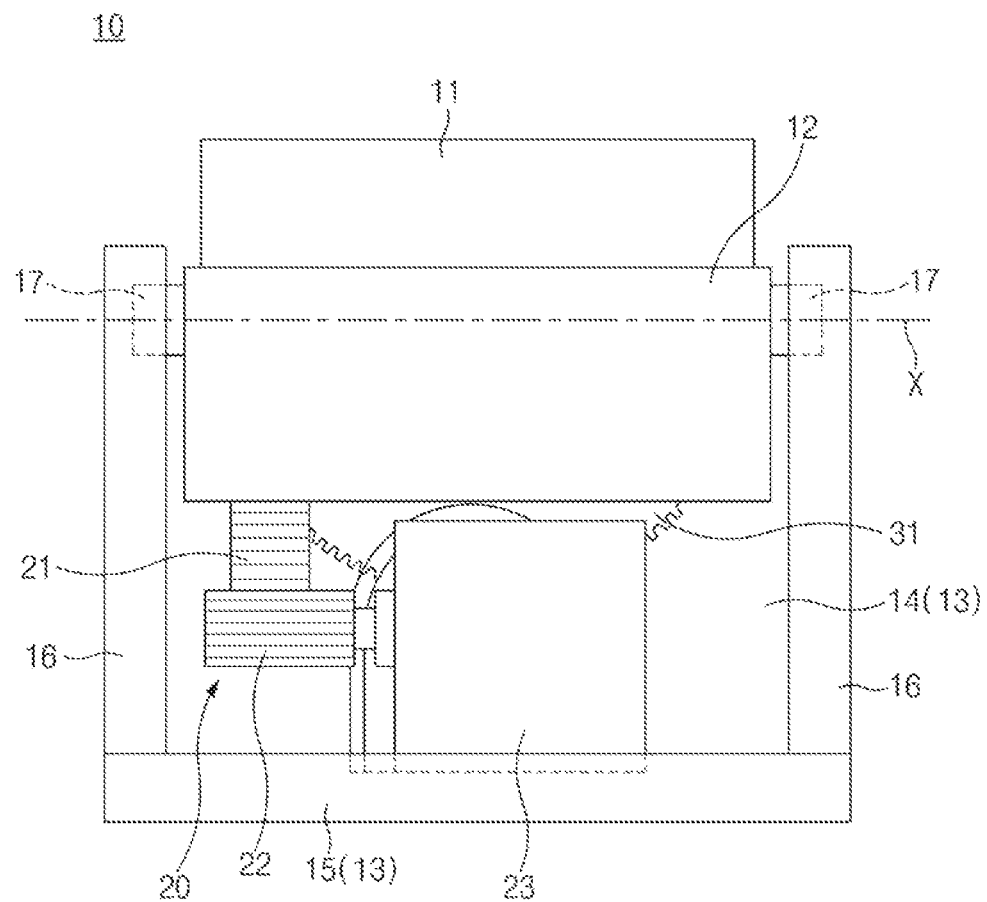
FIG. 5 illustrates a plan view of FIG. 4.
Figure 6:
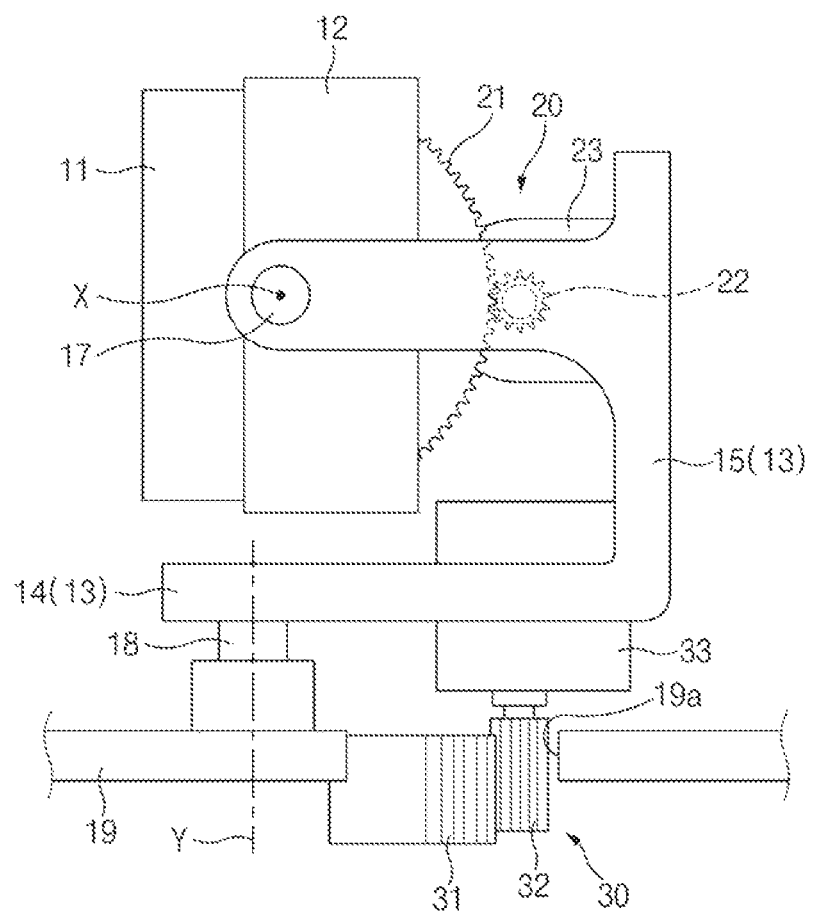
FIG. 6 illustrates a side view of FIG. 4.
Figure 7:
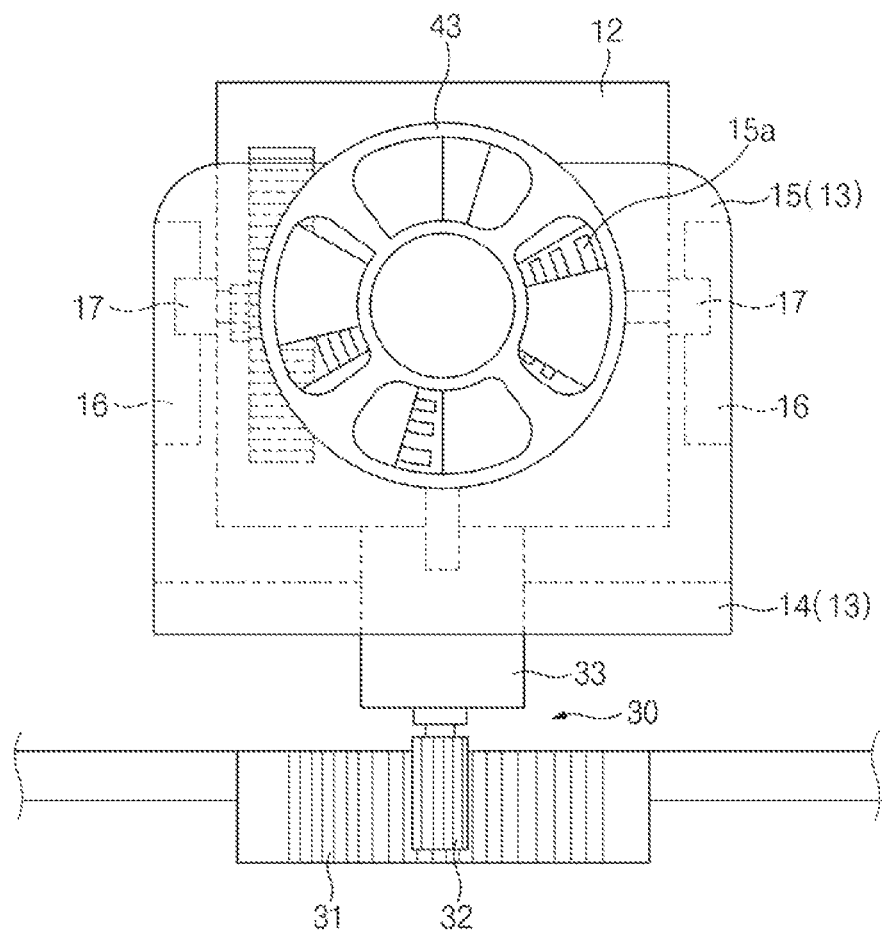
FIG. 7 illustrates a rear view of FIG. 4.

Referring to FIG. 2, the front headlamp assembly 200 in one form of the present disclosure may include a lamp housing 210, a headlamp 220 mounted in the lamp housing 210, and a lamp cover 230 mounted at the front of the lamp housing 210. For example, the headlamp 220 may be configured to rotate around a vertical axis Y1, which allows the headlamp 220 to perform a dynamic bending lighting (DBL) function in a manner that rotates around a horizontal axis so as to irradiate light in the travelling direction or steering direction of the vehicle.

The lamp housing 210 may include a first mounting space 201 in which the headlamp 220 is mounted, and a second mounting space 202 in which the object sensing apparatus 10 is mounted. The first mounting space 201 and the second mounting space 202 may be sufficiently spaced apart from each other so that the headlamp 220 and the object sensing apparatus 10 may not be subjected to thermal influence between each other. The first mounting space 201 may be a light distribution area by the headlamp 220, and the second mounting space 202 may be a sensing area by the object sensing apparatus 10.

The lamp cover 230 may not contain a metallic component that may degrade the sensing performance of the object sensing apparatus 10. In addition, the lamp cover 230 may be made of a light transmitting material to improve the sensing performance of the object sensing apparatus 10.

Meanwhile, the front headlamp assembly 200 may have a self-cleaning mechanism (not shown) for cleaning foreign substances attached to the surface of the lamp cover 230. As the foreign substances attached to the surface of the lamp cover 230 are cleaned by the cleaning mechanism of the front headlamp assembly 200, deterioration in the sensing performance of the object sensing apparatus 10 may be prevented.

Referring to FIG. 16, a pair of front headlamp assemblies 200a and 200b in another form of the present disclosure may be mounted at the front of the vehicle, and the object sensing apparatus 10 may be disposed in each of the front headlamp assemblies 200a and 200b. Thus, the object sensing apparatus 10 may be positioned in the front of the vehicle at the height H1 at which the object sensing apparatus 10 is able to accurately recognize an object, and the pair of object sensing apparatuses 10 may be mounted in the pair of front headlamp assemblies 200a and 200b, respectively, to thereby constitute a stereo-type object sensing system. The headlamp 220 in each of the front headlamp assemblies 200a and 200b may perform the dynamic bending lighting (DBL) function to rotate in the steering direction of the vehicle.

Referring to FIG. 2, the object sensing apparatus 10 according to an exemplary form of the present disclosure may include an object sensor 11 moving (pivoting) around two axes X and Y, which are orthogonal to each other, in the lamp housing 210 of the front headlamp assembly 200. For example, the object sensor 11 may be configured to tilt around the horizontal axis X and rotate around the vertical axis Y.

Referring to FIGS. 3 to 7 in exemplary forms of the present disclosure, the object sensing apparatus 10 may include a vertical-tilting mechanism 20 allowing the object sensor 11 to tilt around the horizontal axis X, and a horizontal-rotating mechanism 30 allowing the object sensor 11 to rotate around the vertical axis Y.

The object sensor 11 may be any one of lidar or radar, or be a combination of lidar and radar. Lidar is a sensor which uses laser signals, and radar is a sensor which uses radio waves.

The object sensor 11 may be mounted in a sensor holder 12, and the sensor holder 12 may be configured to tilt around the horizontal axis X with respect to a support body 13. The support body 13 may have a horizontal portion 14 and a vertical portion 15. The vertical portion 15 may have a pair of support protrusions 16, and the sensor holder 12 may have a pair of first pivot shafts 17 rotatably mounted on the pair of support protrusions 16.

The vertical-tilting mechanism 20 may include a first sector gear 21 fixed to the back surface of the sensor holder 12, a first pinion 22 meshing with the first sector gear 21, and a first actuator 23 rotating the first pinion 22.

The first sector gear 21 may have an arc shape having a predetermined radius. The first sector gear 21 may have a plurality of teeth, be vertically disposed, and rotate around the first pivot shaft 17. For example, the center of the first sector gear 21 may coincide with the center of the first pivot shaft 17.

The first pinion 22 may have a plurality of teeth, and the teeth of the first pinion 22 may mesh with the teeth of the first sector gear 21. As the axis of each first pinion 22 extends horizontally, the axes of the pair of first pinions 22 may become the horizontal axis X.

An output shaft of the first actuator 23 may be coupled to the center of the first pinion 22 so that the first actuator 23 may be configured to rotate the first pinion 22. The first actuator 23 may be mounted on the vertical portion 15 of the support body 13.

In the vertical-tilting mechanism 20, as the first pinion 22 is rotated by the first actuator 23, the first sector gear 21 may rotate around the first pivot shaft 17, and thus the object sensor 11 may tilt around the horizontal axis X.

When the vehicle is travelling on a hillside road, a ramp, or the like, the object sensor 11 may tilt around the horizontal axis by the vertical-tilting mechanism 20 so that the object sensor 11 may accurately sense an object located outside the vehicle.

In particular, according to an exemplary form of the present disclosure, as the object sensing apparatus 10 is disposed in the front headlamp assembly 200, a sufficient height at which the object sensor 11 is able to recognize an object may be secured. Accordingly, when the vehicle is travelling on terrain with elevation changes such as a ramp, the tilting of the object sensor 11 may be performed flexibly and quickly, and terrain changes, preceding vehicles, and the like may be detected quickly and accurately.

The horizontal-rotating mechanism 30 may include a base 19 disposed below the support body 13, a second sector gear 31 mounted on the base 19, a second pinion 32 meshing with the second sector gear 31, and a second actuator 33 rotating the second pinion 32.

The base 19 may be mounted in the lamp housing 210 of the front headlamp assembly 200, and the support body 13 may be connected to the base 19 by a second pivot shaft 18. In particular, the horizontal portion 14 of the support body 13 may be rotatably connected to the base 19 via the second pivot shaft 18 so that the support body 13 may be configured to rotate around the second pivot shaft 18. As the axis of the second pivot shaft 18 extends vertically, the axis of the second pivot shaft 18 may become the vertical axis Y.

The base 19 may have an arc-shaped slot 19a, and the second sector gear 31 may be fixed to the slot 19a of the base 19. The second sector gear 31 may have an arc shape having a predetermined radius. The second sector gear 31 may have a plurality of teeth, and be horizontally disposed. The support body 13 may rotate around the second pivot shaft 18. For example, the center of the second sector gear 31 may coincide with the center of the second pivot shaft 18.

The second pinion 32 may have a plurality of teeth, and the teeth of the second pinion 32 may mesh with the teeth of the second sector gear 31. The second pinion 32 may be vertically extended.

An output shaft of the second actuator 33 may be coupled to the center of the second pinion 32 so that the second actuator 33 may be configured to rotate the second pinion 32. The second actuator 33 may be mounted on the horizontal portion 14 of the support body 13.

In the horizontal-rotating mechanism 30, as the second pinion 32 is rotated by the second actuator 33, the second pinion 32 may move along the arc of the second sector gear 31, and the second sector gear 31 may rotate around the second pivot shaft 18, and thus the object sensor 11 may rotate around the vertical axis Y.

When the vehicle travels on a curve or makes a U-turn, the object sensor 11 may rotate around the vertical axis by the horizontal-rotating mechanism 30, thereby accurately sensing the object located outside the vehicle.

The object sensing apparatus 10 according to an exemplary form of the present disclosure may further include a heat protector 40 surrounding both side surfaces and the rear surface of the support body 13. The heat protector 40 may be made of a material having heat insulation property and heat resisting property, such as a ceramic material, to prevent heat of the headlamp 220 from being transferred to the object sensor 11.

According to an exemplary form, the heat protector 40 may include a first wall 41 facing the rear surface of the support body 13, and a pair of second walls 42 facing both side surfaces of the support body 13. The front and upper part of the support body 13 may be open.

The bottom end of the first wall 41 and the bottom end of each of the second walls 42 of the heat protector 40 may be fixed to the base 19, and a cooling fan 43 may be mounted on the first wall 41 of the heat protector 40. A blowing guide 44 may be disposed around the cooling fan 43, and the blowing guide 44 may guide cooling wind produced by the cooling fan 43 to the object sensor 11.

The support body 13 may have a plurality of cooling holes 15a formed in the vertical portion 15 facing the cooling fan 43, and each cooling hole 15a may have a slot shape. As the cooling wind produced by the cooling fan 43 pass through the cooling holes 15a to be delivered to the object sensor 11, overheating of the object sensor 11 may be prevented.

Figure 8:
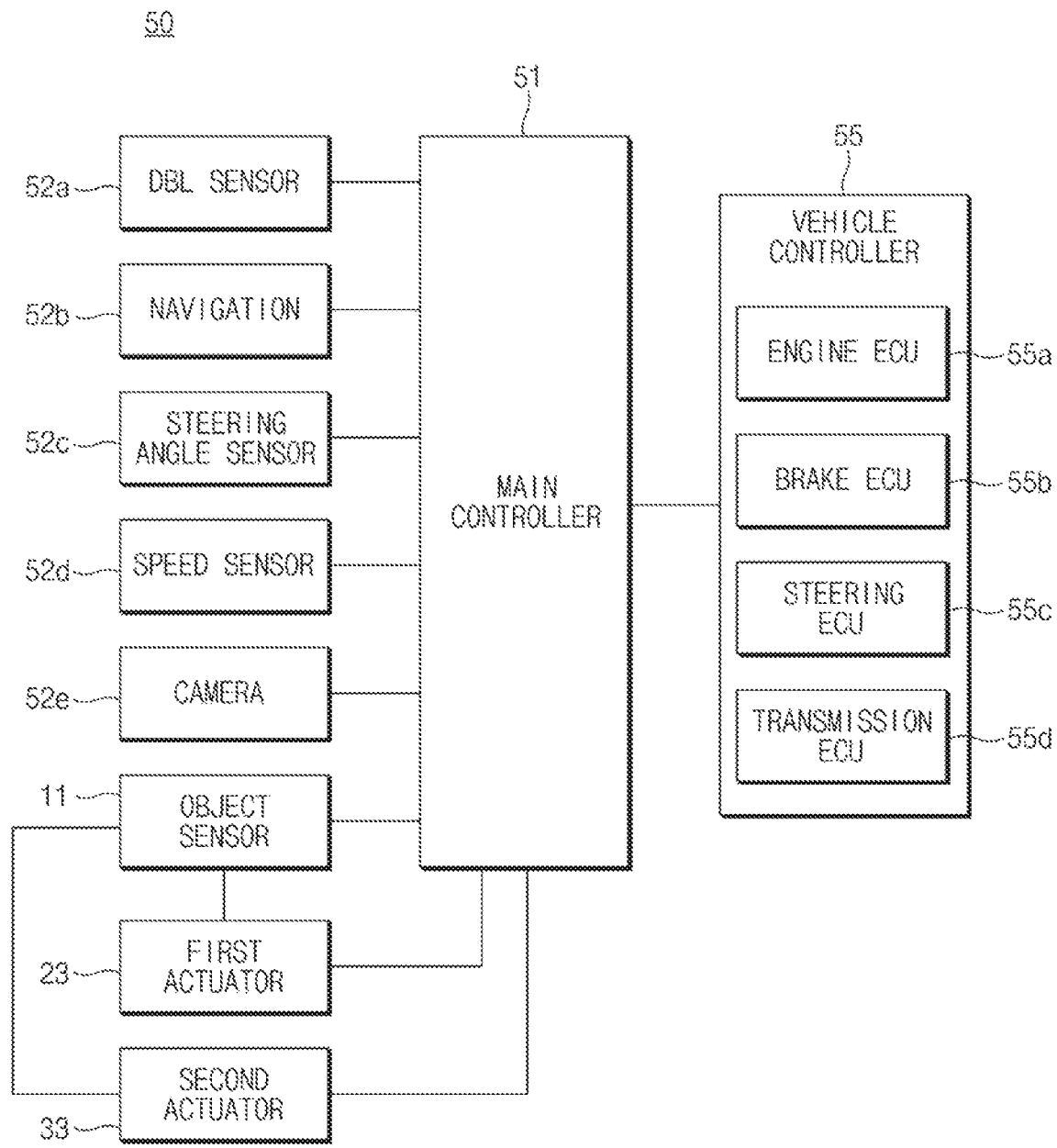
FIG. 8 is a block diagram illustrating the configuration of a vehicle drive control system according to an exemplary form of the present disclosure.

FIG. 8 illustrates a vehicle drive control system 50 to which the object sensing apparatus 10 according to an exemplary form of the present disclosure is connected.

The vehicle drive control system 50 may include a main controller 51 to which a plurality of sensors 52a, 52b, 52c, 52d, and 52e are connected, and a vehicle controller 55 cooperating with the main controller 51.

The plurality of sensors 52a, 52b, 52c, 52d, and 52e may include a DBL sensor 52a sensing a rotation angle of the headlamp 220 when the headlamp 220 performs the DBL function, a navigation 52b indicating a current position of the vehicle and guiding a route to a destination, a steering angle sensor 52c sensing a steering angle of the vehicle, a speed sensor 52d sensing a speed of the vehicle, and a camera 52e photographing the external environment of the vehicle.

The object sensor 11 and the first and second actuators 23 and 33 of the object sensing apparatus 10 may be connected to the main controller 51. Thus, the main controller 51 may receive a tilting angle, rotation angle, and the like of the object sensor 11 from the object sensor 11, and transmit control instructions to the first and second actuators 23 and 33.

The vehicle controller 55 may include an engine ECU 55a controlling the engine, a brake ECU 55b controlling the braking of the vehicle, a steering ECU 55c controlling the steering of the vehicle, and a transmission ECU 55d controlling the transmission of the vehicle.

The vehicle drive control system 50 may be configured to perform driving assistance or autonomous driving (self-driving).

Figure 9A:
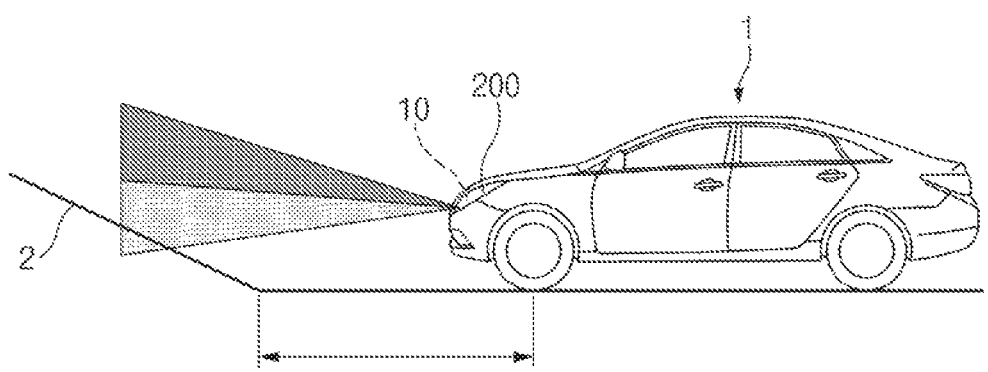
FIG. 9A illustrates a state in which a vehicle ascends an uphill road.
Figure 9B:
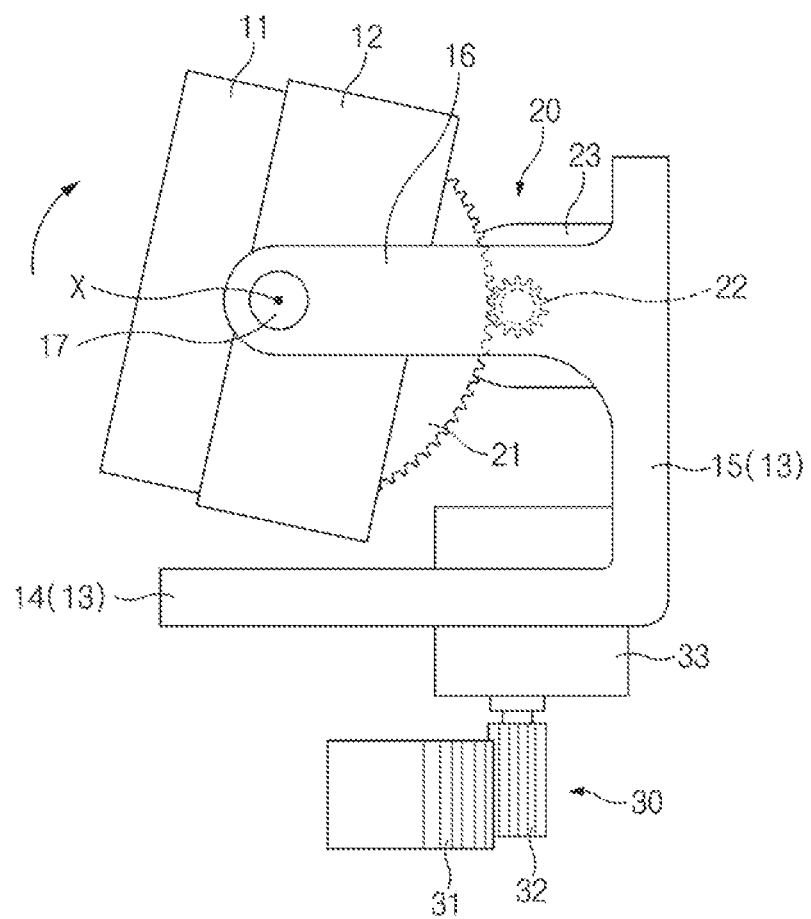
FIG. 9B illustrates an upward tilting operation of an object sensor by a vertical-tilting mechanism in an object sensing apparatus according to an exemplary form of the present disclosure when a vehicle ascends an uphill road.

As illustrated in FIG. 9A, when a vehicle 1 ascends an uphill road 2, the main controller 51 may transmit an upward tilting signal to the first actuator 23, and as illustrated in FIG. 9B, the first pinion 22 may be rotated by the first actuator 23 in a counterclockwise direction, and the first sector gear 21 meshing with the first pinion 22 may rotate around the first pivot shaft 17 in a clockwise direction, and thus the object sensor 11 may tilt upwards.

Figure 10A:
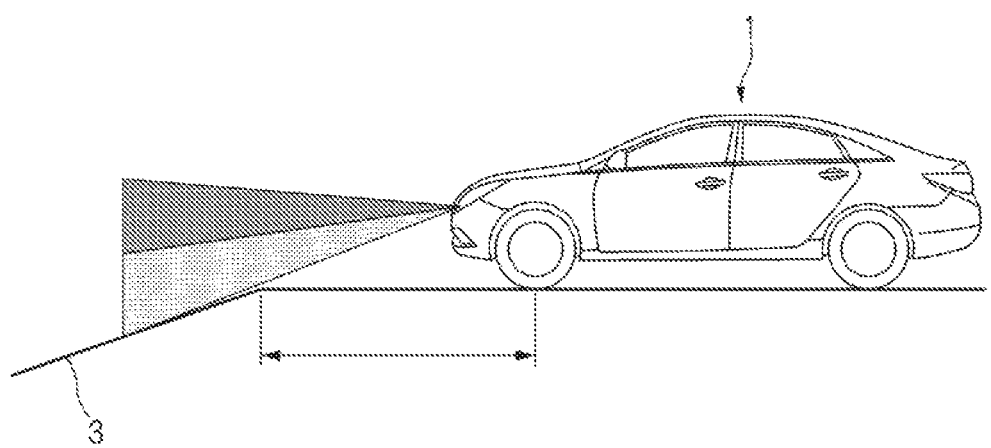
FIG. 10A illustrates a state in which a vehicle descends a downhill road.
Figure 10B:
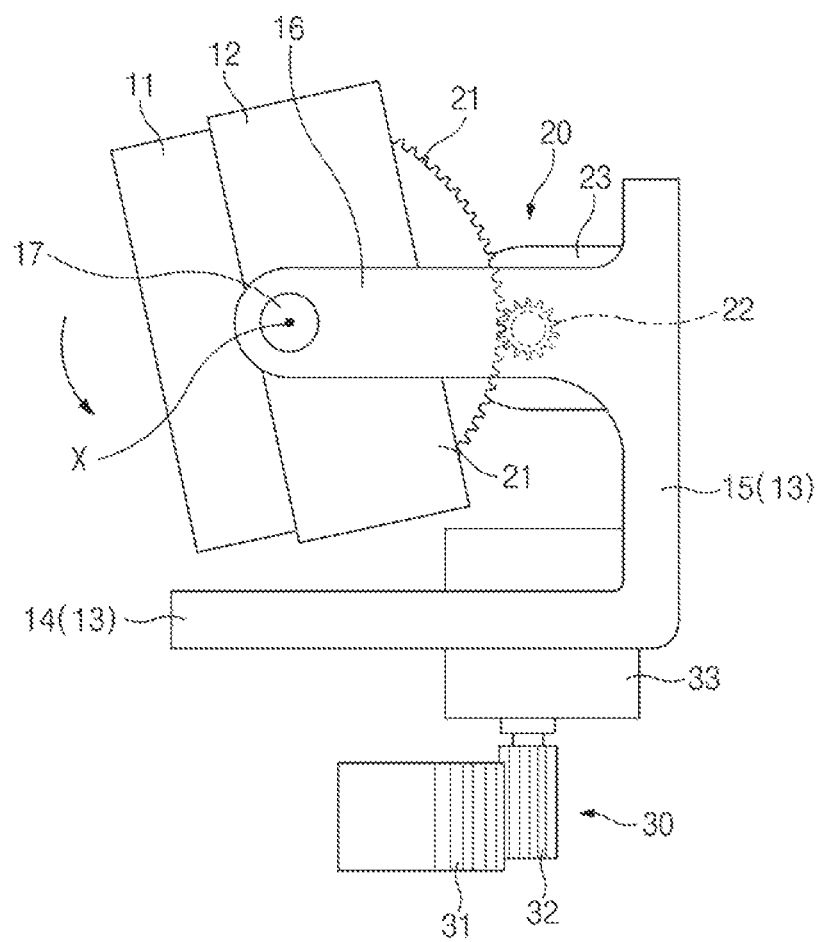
FIG. 10B illustrates a downward tilting operation of an object sensor by a vertical-tilting mechanism in an object sensing apparatus according to an exemplary form of the present disclosure when a vehicle descends a downhill road.

As illustrated in FIG. 10A, when the vehicle 1 descends a downhill road 3, the main controller 51 may transmit a downward tilting signal of the object sensor 11 to the first actuator 23, and as illustrated in FIG. 10B, the first pinion 22 may be rotated by the first actuator 23 in a clockwise direction, and the first sector gear 21 meshing with the first pinion 22 may rotate around the first pivot shaft 17 in a counterclockwise direction, and thus the object sensor 11 may tilt downwards.

Figure 11:
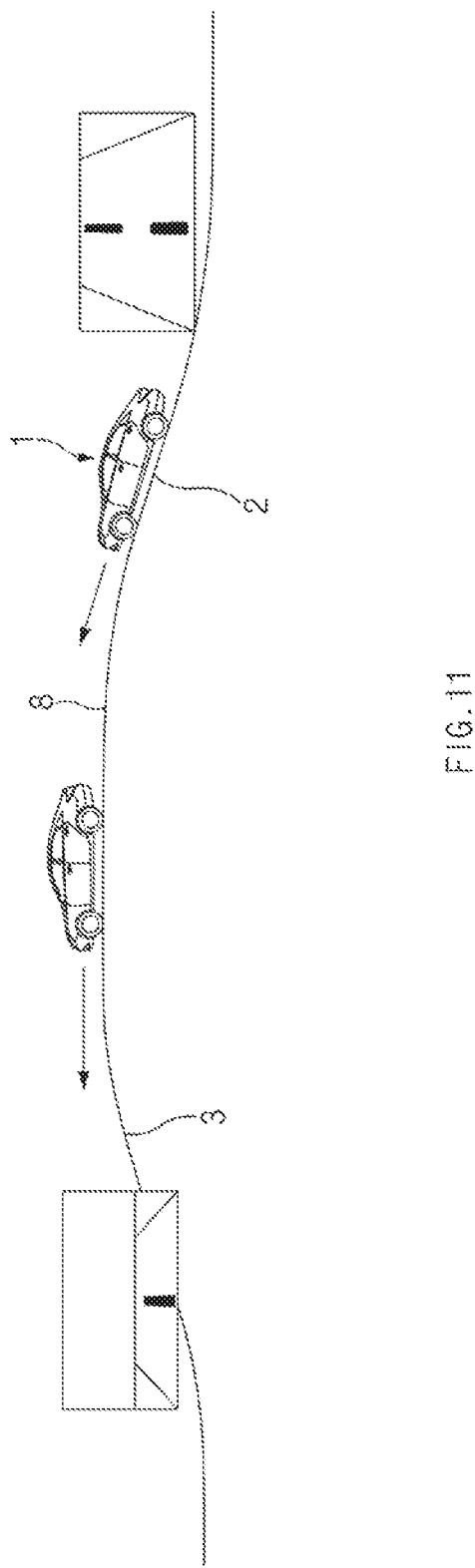
FIG. 11 illustrates a state in which a vehicle is travelling along an uphill road and a downhill road.

As illustrated in FIG. 11, when the vehicle 1 ascends the uphill road 2 and descends the downhill road 3, the elevation of the terrain may be recognized by the image capturing of the camera 52e and the sensing of the object sensor 11, and thus the object sensor 11 may tilt upwards or downwards. In particular, in order to increase the reliability of input values, the main controller 51 may compare and contrast data from the camera 52e and data from the object sensor 11.

Figure 12:
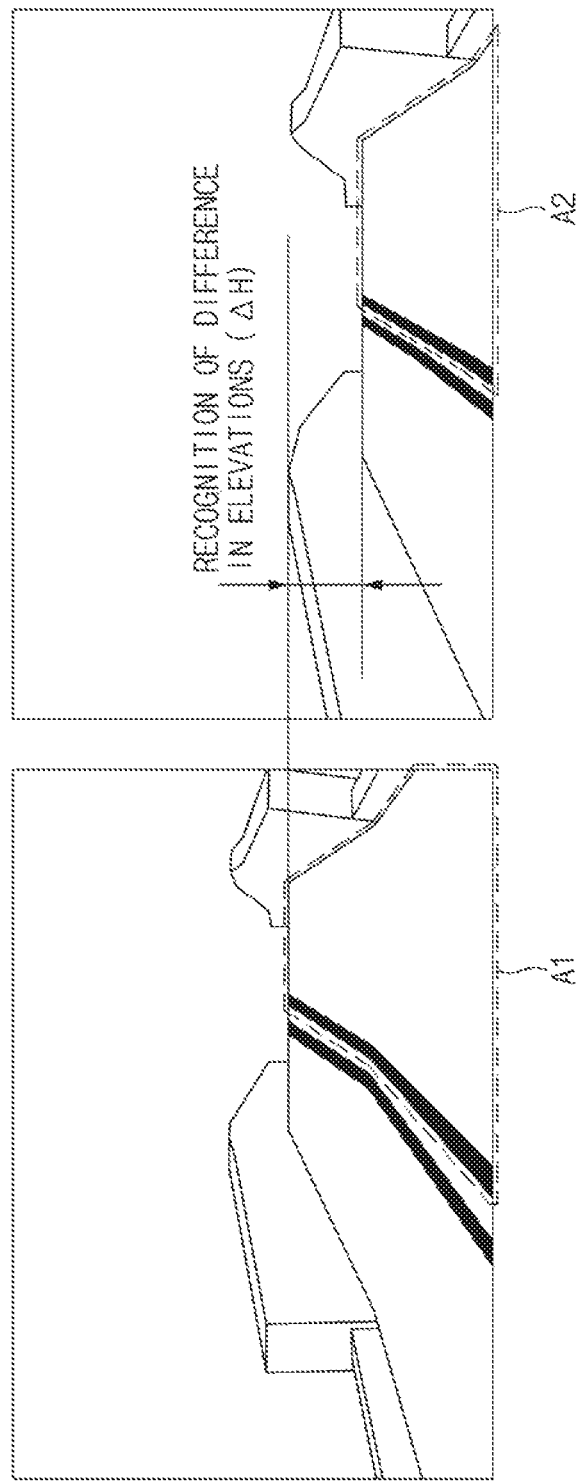
FIG. 12 illustrates a principle in which a vehicle recognizes a terrain change using a camera.

Referring to FIG. 12, the main controller 51 may compare an area A1 of an image obtained by the camera 52e before the vehicle 1 enters the uphill road 2 with an area A2 of an image obtained by the camera 52e before the vehicle 1 enters an apex 8 of the uphill road 2, thereby recognizing and determining elevation ΔH of the terrain.

Figure 13:
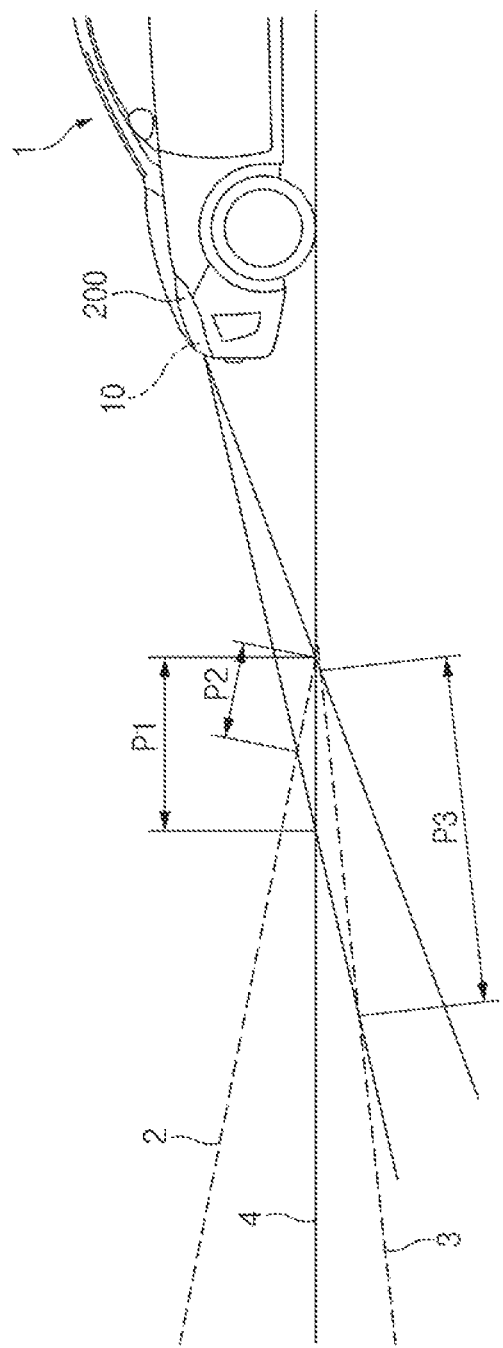
FIG. 13 illustrates a principle in which an object sensor recognizes an uphill road and a downhill road when a vehicle is moving along a flat road, an uphill road, and a downhill road.

In addition, referring to FIG. 13, the main controller 51 may recognize that a projected area P1 of energy projected on a flat road 4 from the object sensor 11 is larger than a projected area P2 of energy projected on the uphill road 2 from the object sensor 11 and determine that the vehicle 1 enters the uphill road 2, and accordingly the main controller 51 may control the first actuator 23 to allow the object sensor 11 to tilt upwards. The main controller 51 may recognize that the projected area P1 of energy projected on the flat road 4 from the object sensor 11 is smaller than a projected area P3 of energy projected on the downhill road 3 from the object sensor 11 and determine that the vehicle 1 enters the downhill road 3, and accordingly the main controller 51 may control the first actuator 23 to allow the object sensor 11 to tilt downwards.

Figure 14:
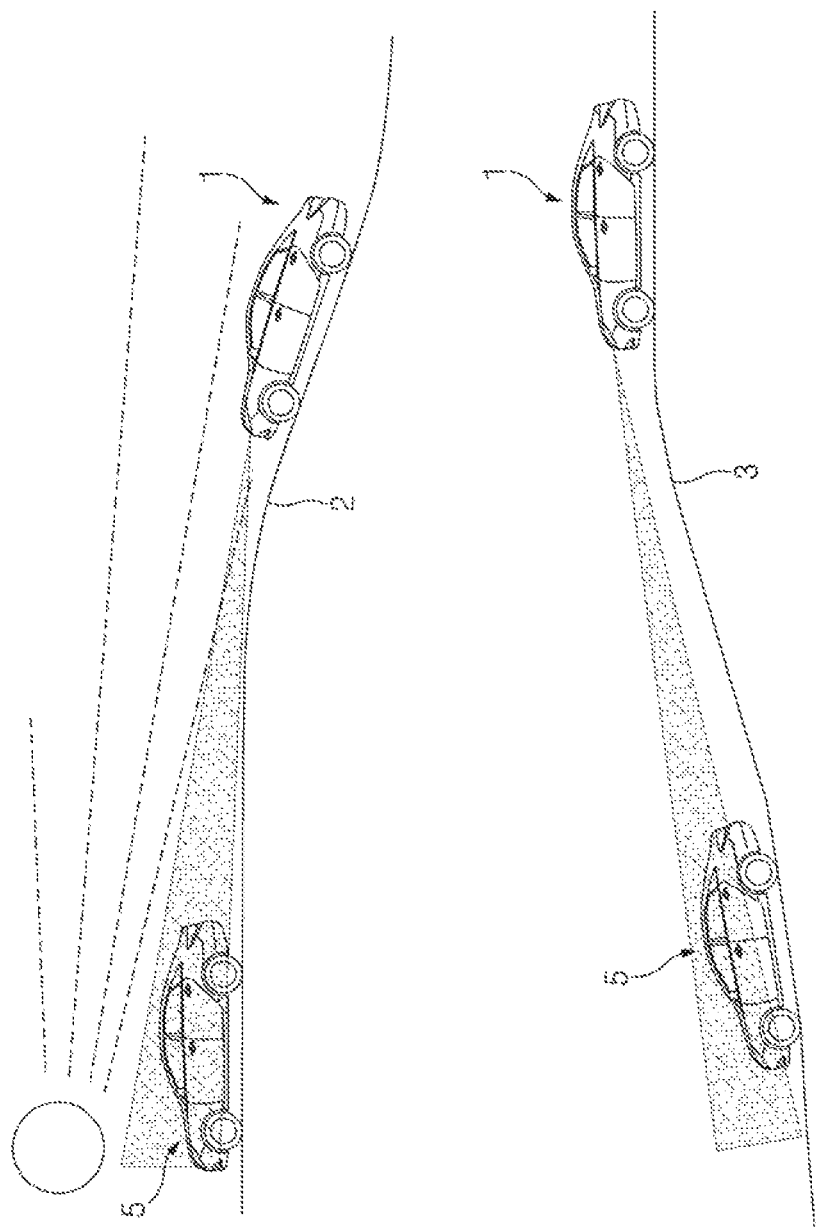
FIG. 14 illustrates a state in which a vehicle is travelling on an uphill road and a state in which a vehicle is travelling on a downhill road.

Referring to FIG. 14, when the vehicle 1 ascends the uphill road 2, the object sensor 11 may tilt upwards, thereby actively recognizing a preceding vehicle 5, road conditions, and the like, and when the vehicle 1 descends the downhill road 3, the object sensor 11 may tilt downwards, thereby actively recognizing the preceding vehicle 5, road conditions, and the like. In particular, as the object sensor 11 tilts in response to elevation changes, it is able to actively track the preceding vehicle 5 and avoid sunlight, thereby preventing distortion, interference, and the like caused by the sunlight, thus preventing misrecognition of the object. In other words, when the vehicle 1 is travelling on the ramp, the preceding vehicle 5, the terrain, and the like may be accurately tracked, and thus the recognition rate thereof may be significantly increased.

Figure 15:
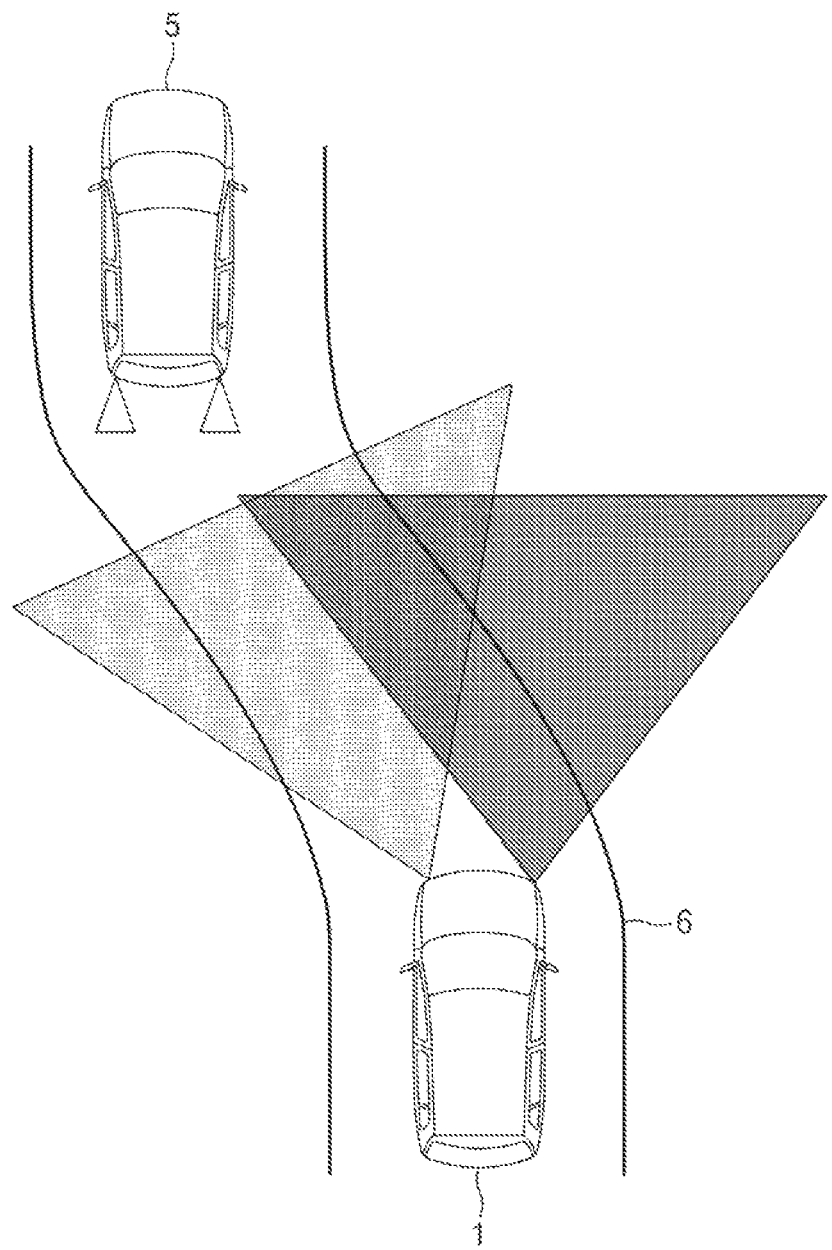
FIG. 15 illustrates a state in which a vehicle is traveling on an S-curve.

Referring to FIG. 15, when the vehicle 1 is travelling on an S-curve 6, the object sensor 11 of the object sensing apparatus 10 may rotate around the horizontal axis along a turning direction of the vehicle 1. In particular, of the pair of front headlamp assemblies 200a and 200b, only the object sensor 11 in the turning-side front headlamp assembly 200a corresponding to the turning direction may rotate around the horizontal axis to correspond to a turning angle of the vehicle, while the object sensor 11 in the opposing-side front headlamp assembly 200b corresponding to the opposite of the turning direction of the vehicle 1 may remain in its original position. For example, as illustrated in FIG. 16, when the vehicle 1 turns left, only the object sensor 11 of the object sensing apparatus 10 in the left-side front headlamp assembly 200a may turn left around the vertical axis at a predetermined angle θ, and the object sensor 11 of the object sensing apparatus 10 in the right-side front headlamp assembly 200b may remain in its original position. The object sensing apparatus 10 may work in conjunction with the headlamps 220 of the front headlamp assemblies 200a and 200b to perform the DBL function. Thus, when the vehicle 1 turns left, only the headlamp 220 in the left-side front headlamp assembly 200a may turn left around the vertical axis at a predetermined angle θ', and the headlamp 220 in the right-side front headlamp assembly 200b may remain in its original position.

Figure 17:
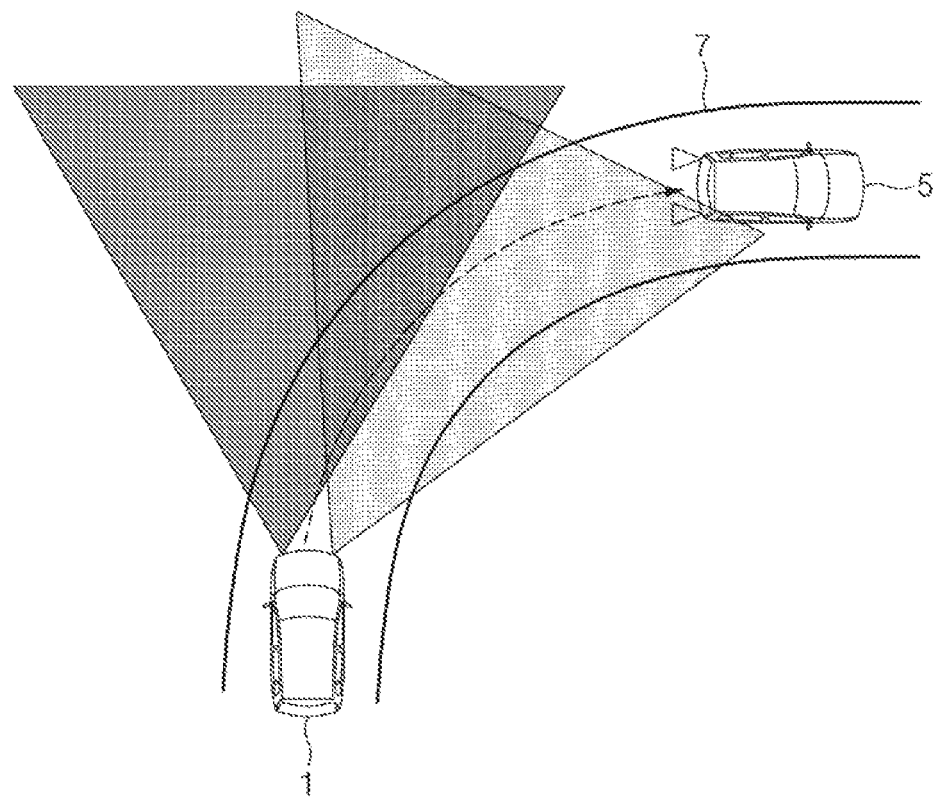
FIG. 17 illustrates a state in which a vehicle is traveling on a curved road.

Referring to FIG. 17, when the vehicle 1 is travelling on a curved road 7 with a small radius, the headlamp and the object sensor in the turning-side front headlamp assembly corresponding to the turning direction of the vehicle 1 may rotate to correspond to the turning angle of the vehicle. Thus, even when the vehicle 1 is travelling on the curved road 7, the preceding vehicle 5, the surrounding terrain, and the like may be recognized accurately and quickly.

Figure 18:
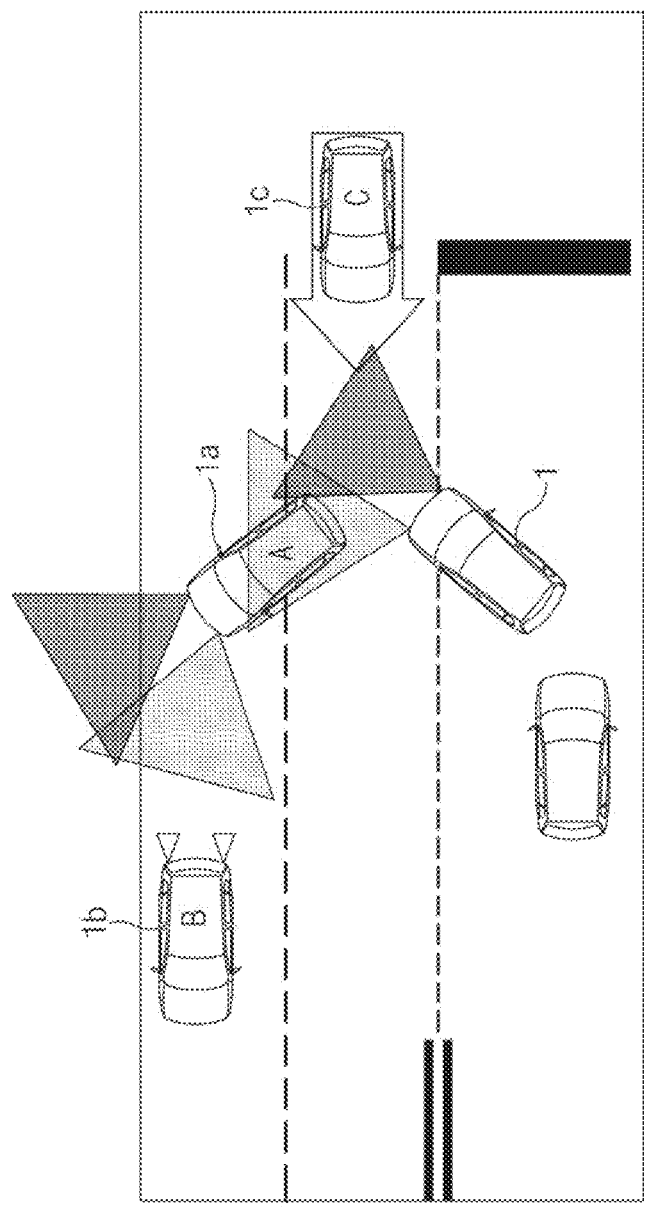
FIG. 18 illustrates a state in which a vehicle makes a U-turn in a U-turn section.

Referring to FIG. 18, when the vehicle 1 makes a U-turn in a U-turn section of the road, the headlamp and the object sensor in the turning-side front headlamp assembly corresponding to the turning direction of the vehicle 1 may rotate to correspond to the turning angle of the vehicle, and the headlamp and the object sensor in the opposing-side front headlamp assembly corresponding to the opposite of the turning direction of the vehicle 1 may remain in its original position. In this manner, a preceding vehicle 1a, a parked vehicle 1b, an oncoming vehicle 1c, and the like may be recognized accurately and quickly.

As illustrated in FIGS. 15 to 18, when the vehicle 1 is turning on the S-curve 6, the curved road 7, and the U-turn section, only the object sensor and the headlamp in the turning-side front headlamp assembly corresponding to the turning direction of the vehicle may rotate to correspond to the turning angle of the vehicle and extend the recognition range of the object sensor, thereby actively recognizing the preceding vehicle, the surrounding terrain, and the like, and stably controlling the speed of the vehicle while turning. Thus, changes in ride comfort, accidents, and the like may be prevented, and fuel efficiency and safety may be provided.

Figure 19:
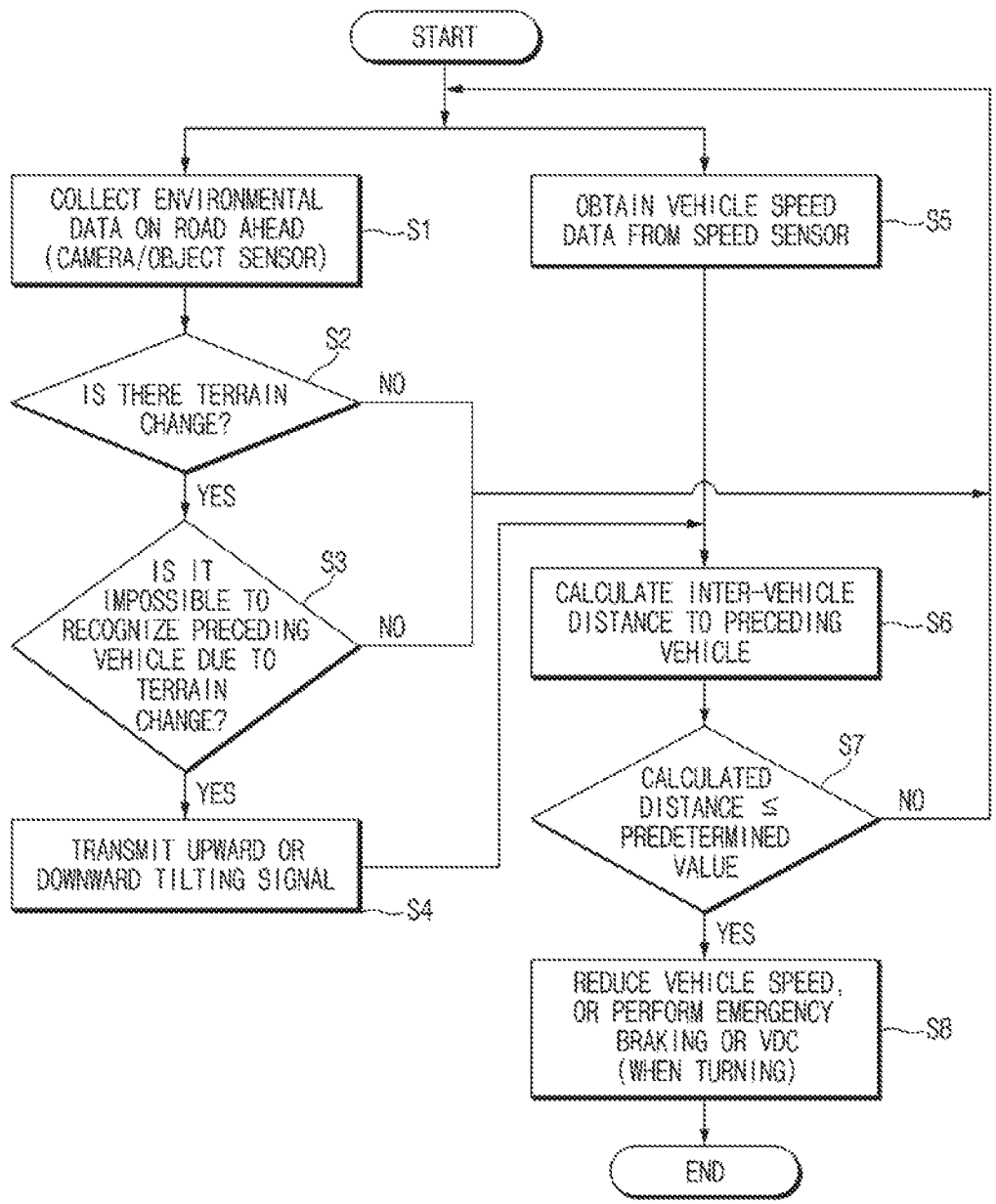
FIG. 19 illustrates a flowchart of a vehicle drive control method according to an exemplary form of the present disclosure.

Referring to FIG. 19, the main controller 51 of the drive control system 50 may collect environmental data on the road ahead of the vehicle from the camera 52e and the object sensor 11 in operation S1.

The main controller 51 may determine whether or not there is a terrain change on the basis of the collected environmental data on the road ahead in operation S2.

When it is determined that there is a terrain change, the main controller 51 may determine whether or not it is impossible to recognize a preceding vehicle due to the terrain change in operation S3.

When it is determined that it is impossible to recognize the preceding vehicle due to the terrain change, the main controller 51 may transmit an upward or downward tilting signal to the first actuator 23 of the object sensing apparatus 10 in operation S4, thereby allowing the object sensor 11 of the object sensing apparatus 10 to tilt.

In addition, the main controller 51 may obtain vehicle speed data from the speed sensor 52d in operation S5, and calculate a inter-vehicle distance to the preceding vehicle corresponding to a lane, a terrain change, and the like extracted by the tilted object sensor 11 in operation S6.

The main controller 51 may determine whether or not the calculated distance is less than or equal to a predetermined value in operation S7. When it is determined that the calculated distance is less than or equal to the predetermined value, the main controller 51 may reduce the vehicle speed, or perform emergency braking or vehicle dynamic control (VDC) in operation S8.

Figure 20:
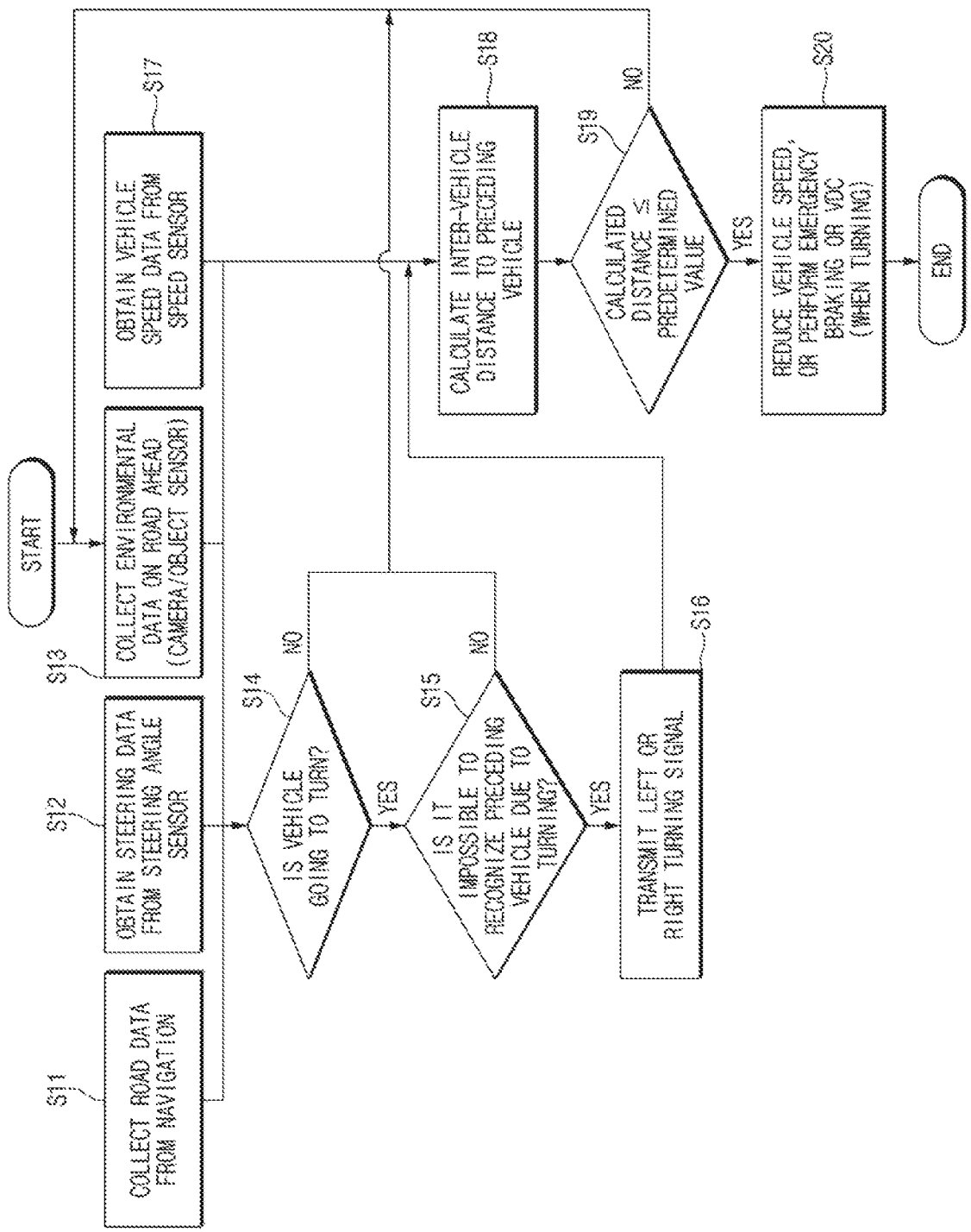
FIG. 20 illustrates a flowchart of a vehicle drive control method according to another exemplary form of the present disclosure.

Referring to FIG. 20, the main controller 51 of the drive control system 50 may collect road data from the navigation 52b in operation S11, obtain steering data from the steering angle sensor 52c in operation S12, and collect environmental data on the road ahead from the camera 52e and the object sensor 11 in operation S13.

The main controller 51 may determine whether or not the vehicle is going to turn on the basis of the collected environment data on the road ahead in operation S14.

The main controller 51 may determine whether or not it is impossible to recognize a preceding vehicle due to the turning of the vehicle in operation S15.

When it is determined that it is impossible to recognize the preceding vehicle due to the turning of the vehicle, the main controller 51 may transmit a left or right turning signal to the second actuator 33 of the object sensing apparatus 10 in operation S16, thereby rotating the object sensor 11 of the object sensing apparatus 10 around the vertical axis.

In addition, the main controller 51 may obtain vehicle speed data from the speed sensor 52d in operation S17, and calculate a inter-vehicle distance to the preceding vehicle corresponding to a lane, a terrain change, and the like extracted by the rotated object sensor 11 in operation S18.

The main controller 51 may determine whether or not the calculated distance is less than or equal to a predetermined value in operation S19. When it is determined that the calculated distance is less than or equal to the predetermined value, the main controller 51 may reduce the vehicle speed, or perform emergency braking or vehicle dynamic control (VDC) in operation S20.

Figure 21:
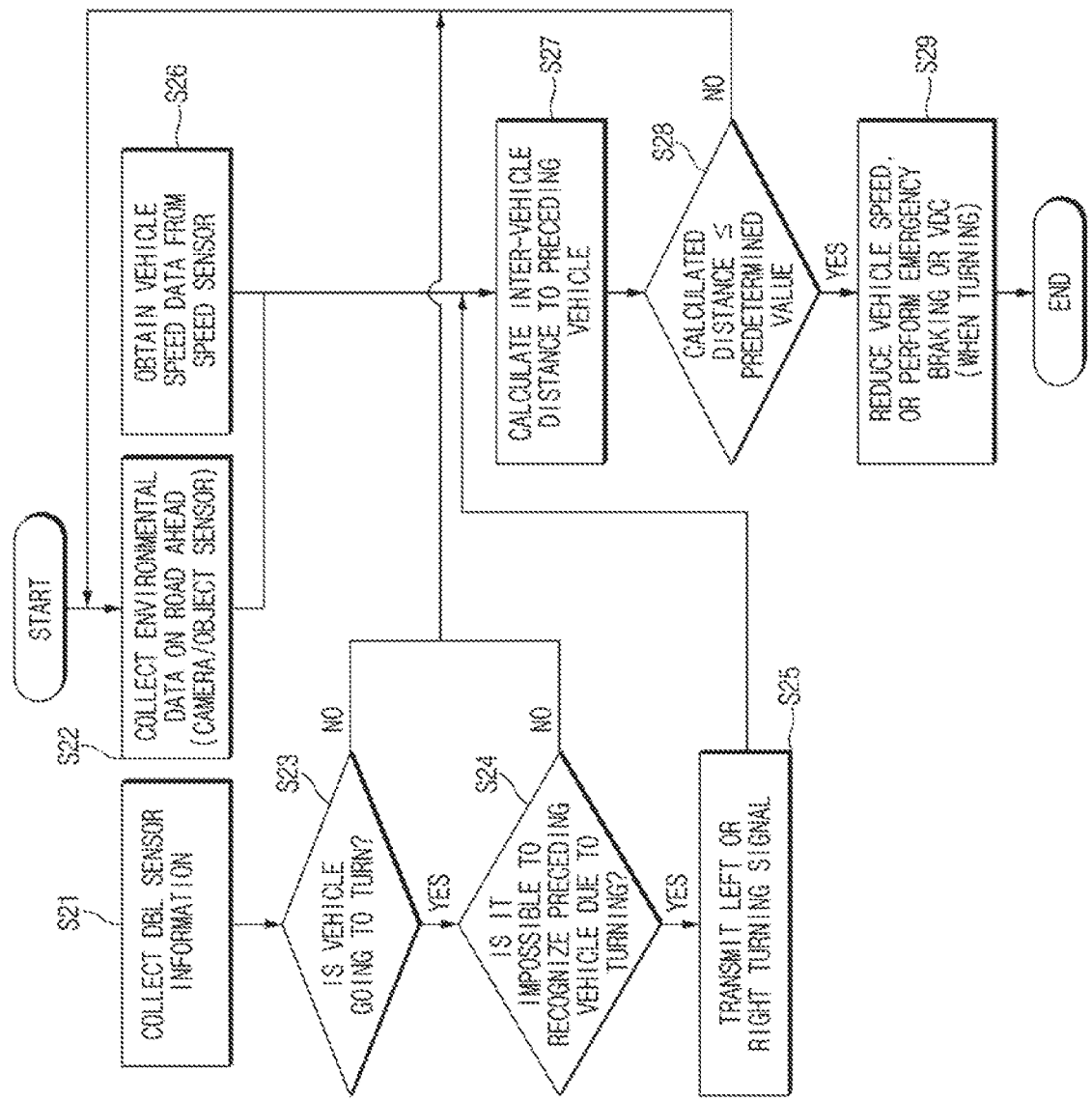
FIG. 21 illustrates a flowchart of a vehicle drive control method according to another exemplary form of the present disclosure.

Referring to FIG. 21, the main controller 51 of the drive control system 50 may collect information on rotation of the headlamp 220 in each of the front headlamp assemblies

200a and 200b from the DBL sensor 52a in operation S21, and collect environmental data on the road ahead from the camera 52e and the object sensor 11 in operation S22.

The main controller 51 may determine whether or not the vehicle is going to turn on the basis of the collected environment data on the road ahead in operation S23.

The main controller 51 may determine whether or not it is impossible to recognize a preceding vehicle due to the turning of the vehicle in operation S24.

When it is determined that it is impossible to recognize the preceding vehicle due to the turning of the vehicle, the main controller 51 may transmit a left or right turning signal to the second actuator 33 of the object sensing apparatus 10 in operation S25, thereby rotating the object sensor 11 of the object sensing apparatus 10 around the vertical axis.

In addition, the main controller 51 may obtain vehicle speed data from the speed sensor 52d in operation S26, and calculate a inter-vehicle distance to the preceding vehicle corresponding to a lane, a terrain change, and the like extracted by the rotated object sensor 11 in operation S27.

The main controller 51 may determine whether or not the calculated distance is less than or equal to a predetermined value in operation S28. When it is determined that the calculated distance is less than or equal to the predetermined value, the main controller 51 may reduce the vehicle speed, or perform emergency braking or vehicle dynamic control (VDC) in operation S29.

As set forth above, the object sensing apparatus 10 according to exemplary forms of the present disclosure may be positioned in the lamp housing 210 to provide the perception of the driving environment due to its high ground clearance, and satisfy various requirements of the layout and sensor operating environment. In addition, the object sensing apparatus 10 may easily detect terrain changes (for example, changes in elevations of the terrain) by the vertical tilting function, thereby eliminating a blind spot and easily recognizing a preceding vehicle, and thus reducing or minimizing the possibility of an accident due to sudden braking and an uncontrollable state caused by sudden detection or misrecognition of the preceding vehicle. Furthermore, the object sensing apparatus 10 may improve the tracking and recognition of the preceding vehicle in successive turns by the horizontal rotating function, and expand the vehicle driving ability in various driving environments such as U-turn, interchange entry and exit, parking entry and exit by autonomous driving (self-driving).

In addition, the vertical tilting function and the horizontal rotating function of the object sensing apparatus 10 according to exemplary forms of the present disclosure may also be applied to a variety of conventional sensors such as front/rear parking assistant sensor using ultrasonic waves, as well as lidar sensor and autonomous emergency braking system, which are essential for autonomous driving. The object sensing apparatus 10 may be mounted on the left and right of the vehicle to be implemented as a stereo-type object sensing system, and thus it may have an effect of extending its recognition range compared to a sensor mounted at the center of the vehicle.

Furthermore, the object sensing apparatus 10 according to exemplary forms of the present disclosure may easily satisfy normal operating conditions or the angle of view of the camera, and minimize the amount of design modification desired to satisfy operating conditions. This may be advantageous in a situation where various sensors are desired to be mounted in combination.

According to exemplary foams of the present disclosure, the object sensing apparatus is capable of accurately recognizing an object located outside the vehicle, thereby enabling the vehicle to perform autonomous driving, semi-autonomous driving, and driving assistance more accurately.

According to exemplary forms of the present disclosure, the object sensing apparatus is capable of accurately recognizing the surrounding terrain, nearby vehicles, and the like, without being affected by the external environment such as driving conditions, road conditions, and sunlight, thereby extending an autonomous driving range of the vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An object sensing apparatus, comprising:
    an object sensor mounted at a front of a vehicle;
    a vertical-tilting mechanism configured to allow the object sensor to tilt around a horizontal axis; and
    a horizontal-rotating mechanism configured to allow the object sensor to rotate around a vertical axis,
    wherein:
        the object sensor is mounted in a sensor holder,
        the sensor holder is mounted to tilt around the horizontal axis with respect to a support body,
        the support body has a pair of support protrusions,
        the sensor holder has a pair of first pivot shafts rotatably mounted on the pair of support protrusions, and
        axes of the pair of first pivot shafts become the horizontal axis.

2. The object sensing apparatus according to claim 1, wherein the object sensor is mounted in a lamp assembly of the vehicle.

3. The object sensing apparatus according to claim 1, wherein the vertical-tilting mechanism includes a first sector gear fixed to a back surface of the sensor holder, a first pinion configured to mesh with the first sector gear, and a first actuator configured to rotate the first pinion.

4. The object sensing apparatus according to claim 3, wherein the first actuator is mounted on the support body.

5. The object sensing apparatus according to claim 1, wherein the horizontal-rotating mechanism includes a base disposed below the support body, a second sector gear mounted on the base, a second pinion configured to mesh with the second sector gear, and a second actuator configured to rotate the second pinion.

6. The object sensing apparatus according to claim 5, wherein the support body is rotatably connected to the base via a second pivot shaft, and
    an axis of the second pivot shaft becomes the vertical axis.

7. The object sensing apparatus according to claim 6, wherein the base has an arc-shaped slot, and
    the second sector gear is fixed to the arc-shaped slot of the base.

8. The object sensing apparatus according to claim 5, further comprising a heat protector configured to surround both side surfaces and a rear surface of the support body.

9. The object sensing apparatus according to claim 8, wherein the heat protector includes a first wall facing the rear surface of the support body, and a pair of second walls facing the side surfaces of the support body.

10. The object sensing apparatus according to claim 9, wherein the heat protector further includes a cooling fan which is mounted on the first wall.

11. The object sensing apparatus according to claim 10, wherein the heat protector further includes a blowing guide which is disposed around the cooling fan.

12. The object sensing apparatus according to claim 11, wherein the support body has a plurality of cooling holes in a portion thereof facing the cooling fan.

* * * * *